July 10, 1962 L. H. DAVIS ET AL 3,043,507
APPARATUS FOR MEASURING AND RECORDING VALUES
Filed Jan. 31, 1957 5 Sheets-Sheet 1

INVENTORS,
Loyal H. Davis
Herbert Arkin
Otis L. Updike, Jr
BY
ATTORNEY

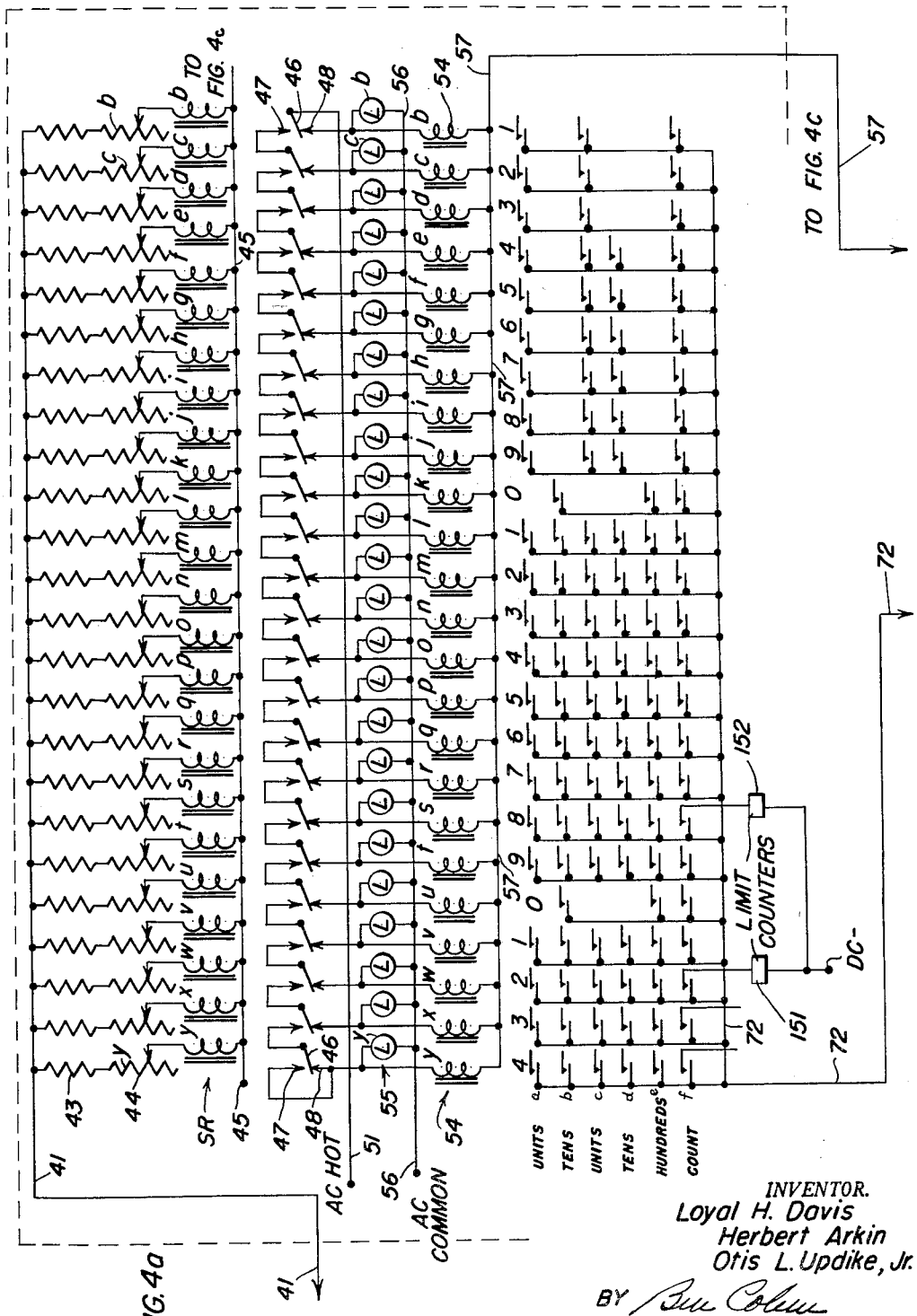

July 10, 1962 L. H. DAVIS ET AL 3,043,507
APPARATUS FOR MEASURING AND RECORDING VALUES
Filed Jan. 31, 1957 5 Sheets-Sheet 3
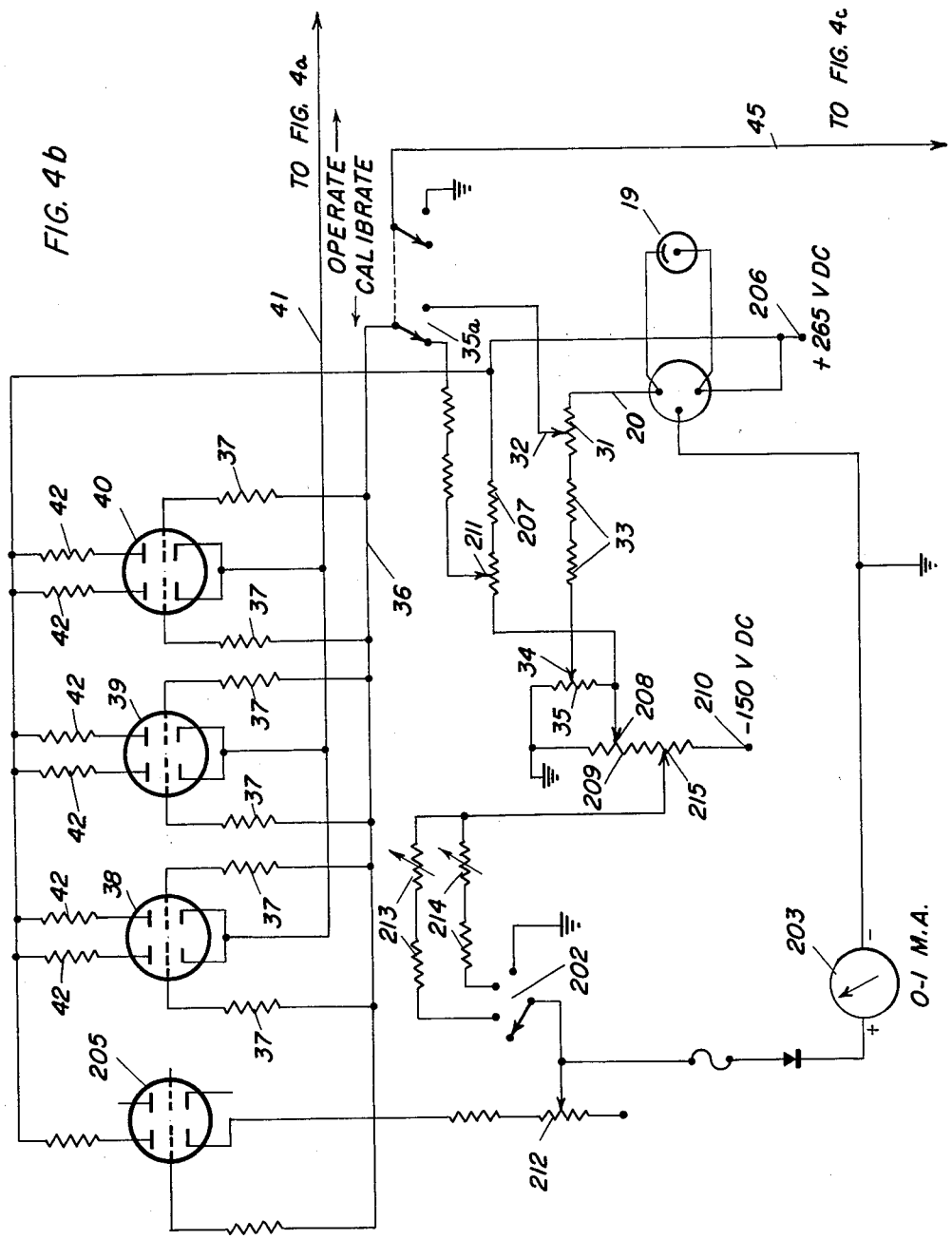
INVENTORS
Loyal H. Davis
Herbert Arkin
Otis L. Updike, Jr.
BY
ATTORNEY July 10, 1962  L. H. DAVIS ET AL  3,043,507
APPARATUS FOR MEASURING AND RECORDING VALUES
Filed Jan. 31, 1957  5 Sheets-Sheet 4

INVENTORS
Loyal H. Davis
Herbert Arkin
Otis L. Updike, Jr.
BY
ATTORNEY

July 10, 1962  L. H. DAVIS ET AL  3,043,507
APPARATUS FOR MEASURING AND RECORDING VALUES
Filed Jan. 31, 1957  5 Sheets-Sheet 5
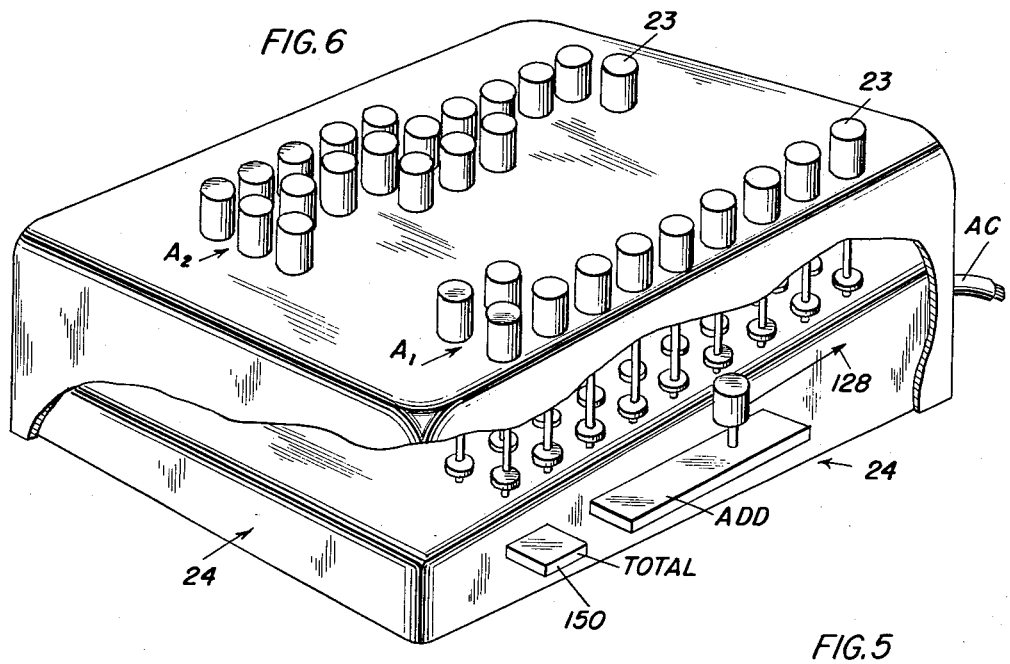
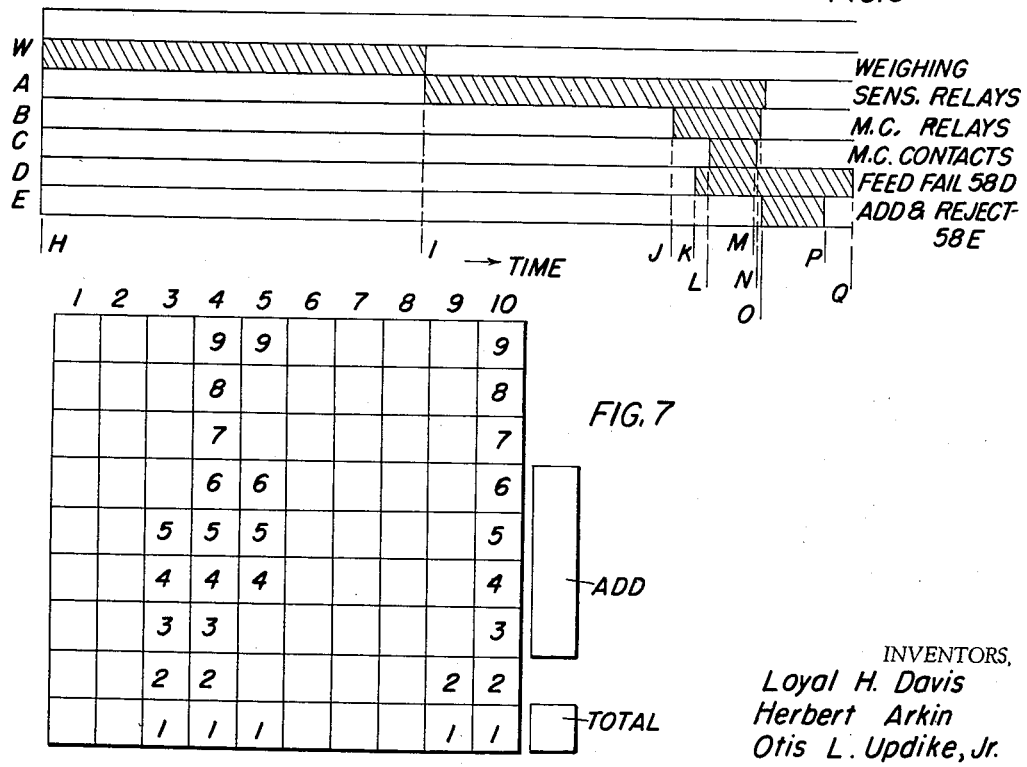
INVENTORS,
Loyal H. Davis
Herbert Arkin
Otis L. Updike, Jr.
BY
ATTORNEY

3,043,507
APPARATUS FOR MEASURING AND RECORDING VALUES

Loyal H. Davis, Richmond, Va., Herbert Arkin, New York, N.Y., and Otis L. Updike, Jr., Charlottesville, Va., assignors to Philip Morris Incorporated, New York, N.Y., a corporation of Virginia
Filed Jan. 31, 1957, Ser. No. 637,527
17 Claims. (Cl. 235—151)

The present invention relates generally to calculating machines, and more particularly to systems for automatically computing certain statistical measures pertaining to physical characteristics of a plurality of objects.

It is well known that variations exist in all the products of industry, whether the objects be large or small, handmade or machine-made, and whether they are produced on a large or on a small scale. The cigarette industry is a highly mechanized industry in which tremendous quantities of cigarettes are produced automatically by machine, and in which variation of product from standard is of major importance.

All the cigarettes of any given brand may look alike, and may include tobacco of one specific brand, but they inevitably contain shreds of tobacco from hundreds of different leaves, no two of which are exactly alike. In the manufacturing of cigarettes, everything possible is done to insure uniformity. There are, however, so many variables in the operation that it is impossible to make two cigarettes precisely alike.

One of the ways in which cigarettes differ is in the amount of tobacco the cigarette-making machine includes in each cigarette. This quantity is important both to the manufacturer and to the smoker. The manufacturer desires that no more tobacco shall be consumed than is necessary, since it increases his direct costs if unnecessary quantities of tobacco are utilized. At the same time he wishes to please the consumer of the cigarette with uniform cigarettes, since any deviation from uniformity effects some change in weight of the cigarette, which, in turn, affects the resistance to draw as well as the taste of the cigarette. Sufficiently light cigarettes may collapse after a few puffs, besides giving a hotter smoke due to a more rapid rate of burning, with less filtration.

It has been found, by means of statistical analyses, that the weights of individual cigarettes provide an excellent measure of the capabilities of various types of cigarette-making machines for producing uniform cigarettes. An analysis conducted on a relatively few cigarettes enables prediction of the manner in which a cigarette-making machine is operating. If a test shows a marked deviation in one direction of average cigarette weight, it indicates that the machine is not operating properly, and should, accordingly, be inspected in order to determine the reason for improper operation. The testing involves weighing of a considerable number of cigarettes, and such routine weighings are time-consuming as well as tedious. They involve not only manual weighings but also tallyings and calculations. Nevertheless, such procedures are an important part of statistical quality control. It therefore has become important to provide an automatic machine which will perform the necessary weighings and calculations required for effecting statistical studies of cigarette production. The present system constitutes such a machine. To indicate the effectiveness of automatic calculation as against manual calculation, it has in the past required approximately twenty minutes for a complete weighing, tallying and calculation relating to one hundred cigarettes, by the manual method. By utilizing the system of the present invention, the elapsed time per run, including the various computations, is about five minutes, with better reproducibility and greater accuracy than can be expected when employing the manual method.

Briefly describing a preferred embodiment of the invention, a device is provided for automatically feeding individual objects, specifically cigarettes, to a transducer which measures a physical characteristic of the objects, specifically weight, and translates the measurements as electrical signals. The description will proceed on this basis, without thereby intending any limitation in respect to the character of the physical characteristic, or the character of the objects, the system being applicable to a wide variety of objects and physical characteristics. Devices are provided for automatically obtaining the sum of the weights of a predetermined number of the objects, and the sum of the squares of the weights, in response to the electrical signals. From the sums so obtained may be readily calculated the arithmetic mean of the weights and the standard deviation, or root-mean-square deviation. These values are useful in connection with quality control and statistical research, in cigarette manufacture.

The system includes an automatic device for feeding cigarettes one by one to a balance, the balance itself, and an eject mechanism for removing cigarettes from the balance at a proper point in a weighing cycle, a transducer for translating deflection of the balance to an electrical analogue output, devices for converting the electrical analogue output into an indication of weight group within which each weighed cigarette falls, and devices for adding the weight group numbers, and the squares of these. In addition, there may be provided devices for adding the number of items which falls within each of a plurality of preselected weight groups or combinations thereof, and a means for stopping the operation of the system after a specified number of cigarettes has been processed.

In more general terms, the system of the invention comprises a device for automatically feeding objects to a transducer which provides an electrical analogue output representative of a desired characteristic of each object, means for translating the electrical analogue outputs into quantized groups, and means for obtaining the total weights of the class groups for a predetermined number of objects, and obtaining also the sum of the squares of the weights of the class groups for the same objects.

A primary and unique feature of the present invention is its automatic compilation of the sums and sums of squares of measured characteristics, from which may be derived quickly and with a minimum of computation statistical measures such as standard deviation, arithmetic mean, and other statistical measures useful in industrial research and quality control. It is, accordingly, a broad object of the present invention to provide a novel calculating device for obtaining data valuable in statistical research and quality control.

It is a further object of the invention to provide a system for feeding objects in sequence to a transducer which derives, in terms of an electrical analogue signal, quantities representative of groupings or cells into which fall some specified characteristic of the object, these groupings or cells being weighted, obtaining the sum of the weights of the groupings or cells, and the sum of the squares of the weights of the groupings or cells, for a predetermined number of objects, and performing the entire required sequence of operations automatically, rapidly and efficiently.

Still a further object of the invention resides in the provision of a completely automatic electronic apparatus which, when an unspecified quantity of cigarettes is supplied to the machine, computes and records statistical measures for a predetermined sample of such cigarettes.

In another aspect of the invention, there is provided an electronic calculating machine which automatically computes a statistical evaluation of the uniformity of individual cigarettes.

The above and still further objects, features and advantages of the present invention will become apparent upon consideration of the following detailed description of a preferred embodiment of the invention, particularly when taken in conjunction with the accompanying drawings wherein.

Figure 4C:
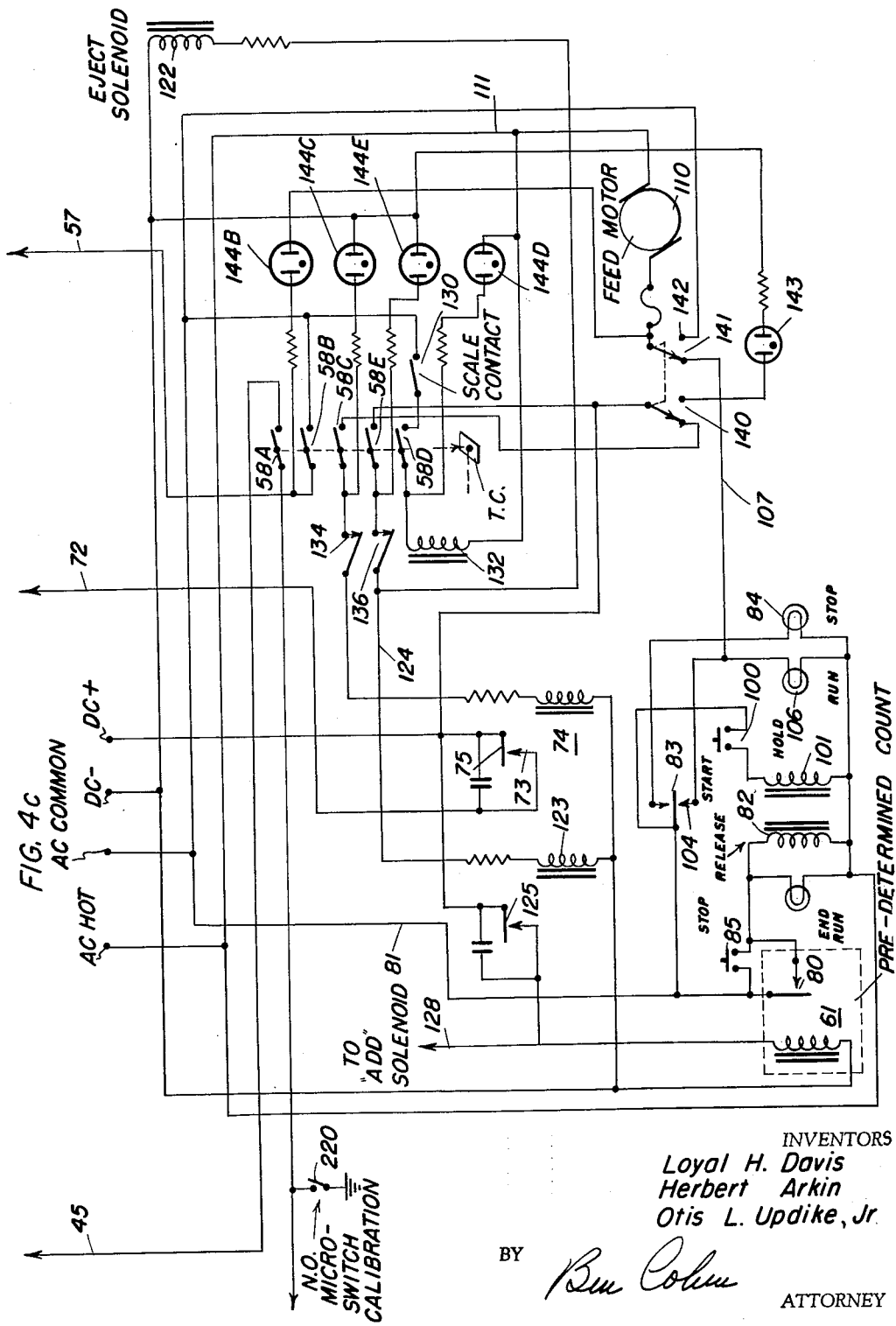

FIGURES 4a–4c, taken together constitute a schematic circuit diagram of a system in accordance with the present invention;

FIGURE 5 is a timing diagram useful in explaining a cycle of operation of the system;

FIGURE 6 is a view in perspective of a solenoid actuated adding machine, having two adding machine sections, one of which provides sums of weights and the other the sums of the squares of weights, and which constiutes an element of the present system; and FIGURE 7 is a plot of the locations of key actuating solenoids for the adding machines of FIGURE 6.

Figure 1:
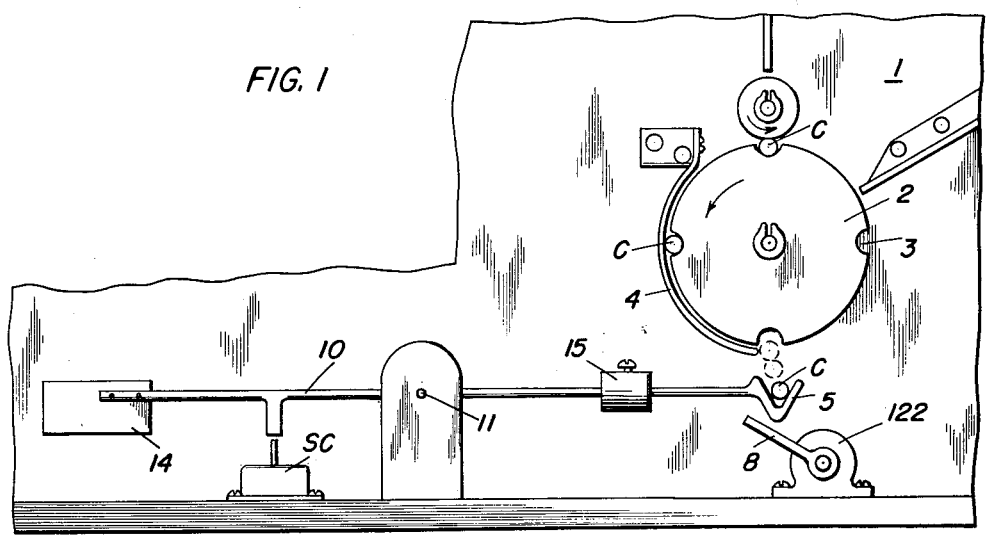
FIGURE 1 is a view in side elevation of a cigarette feed and weighing device.

Referring now more specifically to the accompanying drawings, and more specifically to FIGURE 1 thereof, the reference numeral 1 denotes a gravity feed hopper for cylindrical objects C which may, in a specific and preferred application of the present invention, be cigarettes. Located at the egress of the hopper 1 is a rotary cylinder 2, which as seen in FIGURE 1, rotates in a counterclockwise direction, and which contains in its periphery a number of radially extending slots 3, each capable of conveying one of the cylindrical objects. The latter are conveyed counterclockwise by the cylinder 2, past a curved guard rail 4 which terminates above a scale pan 5, so that as each cigarette emerges past the end of the guard rail 4, it drops on to the scale pan 5. The latter may consist of two arms, separated along the length of the cylindrical number by a distance adequate to support the cylindrical object horizontally in stable relation. After a weighing operation has been completed, an ejector arm 8, which is solenoid actuated, removes the cylindrical object from the scale pan 5, into any suitable receptacle (not shown).

The scale pan 5 resides at one end of an elongated rod 10 that is supported adjacent its center on a transverse pivot 11. A light weight damping vane 14 may be secured to the rod 10 at the end thereof which lies opposite the end containing the scale pan 5. A counter-weight 15 is provided for counterbalancing the weight of the vane 14, and the arrangement and distribution of weights is so selected that the elongated rod 10 will assume an angular position with respect to the horizontal which is determined in accordance with the weight of the cylindrical object C. A light source 17 is provided, light emerging from which is condensed by a suitable condensing lens 18, and passes from the condensing lens 18 to a photoelectric cell or tube 19. The light emerging from the condensing lens 18 contains parallel rays. These light rays are in part intercepted by the vane 14, so that the total quantity of light impinging on the photoelectric cell 19 is a function of the angular position of the vane 14, and accordingly of the weight of a cylindrical object C deposited on scale pan 5.

Figure 2:
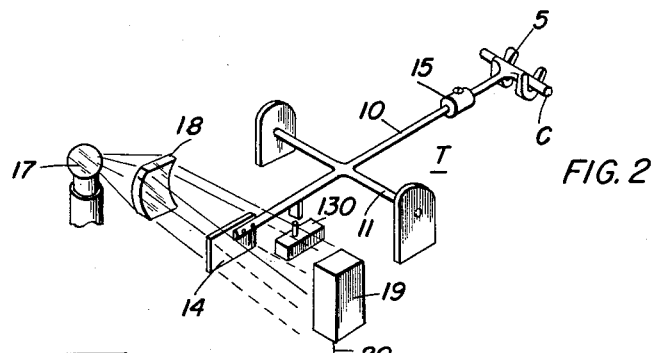
FIGURE 2 is a view, partly in perspective and partly in functional diagram, of a photo-electric transducer which is capable of translating angular position of a balance arm into an electrical analogue output signal representative of a weight.
Figure 3:
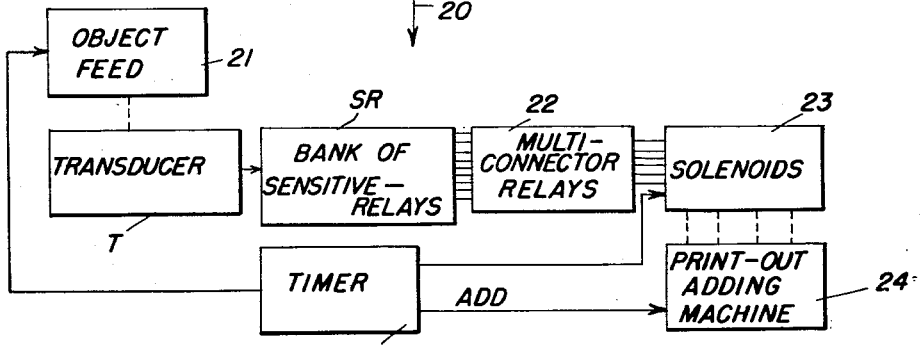
FIGURE 3 is a block diagram of the present system.

Referring now more specifically to FIGURE 3 of the accompanying drawings, wherein is illustrated in block diagram form the general arrangement of the present system, a transducer T is provided, the specific details of which are illustrated in FIGURES 1 and 2 of the accompanying drawings, and have been described in connection with those figures. Transducer T supplies signals in sequence as objects are fed thereto from an object feed device 21, which in the presently described embodiment of our invention includes the hopper 1 and the feed cylinder 2. The output from the transducer T may be in the form of electrical voltage, which is applied in parallel to a bank or array of current sensitive relays SR, each of which is arranged to respond to a different current. Accordingly, a plurality of the sensitive relays may be actuated in response to each weighing operation, and those of the sensitive relays will be selected for operation which correspond with the weight of the then weighed cylindrical objects or any lesser weight. The sensitive relays select connector relays 22, there being wiring interconnecting the bank of sensitive relays and the bank of connector relays such that one only of the connector relays will be actuated for each weighing operation, and that one will represent the weight grouping of the weighed cylindrical object. The connector relays 22 then actuate solenoids 23 selectively, the latter being employed to actuate the push rods of a print-out adding machine 24 in accordance with weight grouping. A timer 25 is provided for controlling the cycle of operations of the machine, i.e., the timer supplies synchronizing signals to the object feed device 21, and controls the solenoids 23 so that they actuate the adding machine 24 only following completion of each weighing operation, and further actuate an add solenoid of the adding machine 24 after a weight grouping has been inserted.

Reference is now made to FIGURES 4a to 4c, inclusive, of the accompanying drawings, which together constitute a schematic circuit diagram of a specific embodiment of the invention.

In the circuit of FIGURES 4a to 4c the photo-cell 19 supplies output signal to an output lead 20, which is connected to ground via a circuit including a potentiometer 31 and via fixed resistances 33, the low voltage end of the latter connecting to a slider 34 of a potentiometer 35 having relatively low resistance, the latter proceeding at one end to ground. The variable tap 32 of the potentiometer 31 is connected via a switch 35a, in the "Operate" position to a lead 36. The lead 36 is connected via current limiting resistances 37 to the grids of a plurality of cathode follower twin triodes 38, 39 and 40. Adjustment of the variable tap of the potentiometer 32 permits adjustment of the gain of the cathode follower twin triodes 38, 39 and 40, there being effectively six such triodes, all connected in parallel, and the triode tubes being preferably of the 6SN7GT type. The parallel connection of a plurality of cathode follower circuits is required in order to provide the desired amplitude of output current. The cathode of the cathode follower triodes are all connected in common to an output lead 41, which is connected in parallel to a plurality of sensitive relays SR. Suitable anode resistances 42 are connected in series with each anode of the twin triodes 38, 39 and 40, for voltage dropping purposes.

The sensitive relays SR may all be identical. Connected in series with each of the SR relays is a fixed resistance 43 and an adjustable resistance 44. The adjustment of the several adjustable resistances 44 may be so made that resistance in series with the several SR relays is progressively varied in steps as one proceeds along the bank of relays from right to left. Accordingly, in response to any given voltage on the lead 41, the several relays receive different currents, and the relays are so designed, arranged and adjusted that each will pick up its contact only in response to a predetermined minimum energizing current, which is the same for all the relays. The arrangement is such that the SR relay on the extreme right of the diagram receives its energizing current at minimum voltage on line 41, as seen in FIGURE 4a of the accompanying drawings, and that on the extreme left receives its energizing current at maximum voltage on line 41. Accordingly, in response to each weighing operation, the SR relays which are selected for operation extend from the right toward the left, and at some point along the bank no further relays are actuated. The several relays are identified by the lower case letters *b* to *y*, where it is necessary for clarity of exposition that they be referred to on an individual basis.

Each of the SR relays includes a movable armature 46 and two stationary contacts 47, 48, with which the armature 46 makes contact alternatively. In the unactuated condition of the SR relays the armature 46 makes contact with the lower contact 48, and the upper contacts 47 are all open. In order to identify the several sets of contacts, relays and armatures, the identifying letters *b* to *y* hereinabove applied to the sensitive relays SR are also employed to identify the contacts and armatures. The armature 46*b* is connected to a common power line 51, each of contacts 47*b* to 47*x* is connected to the next succeeding armature, i.e. the contact 47*b* is connected to the armature 46*c*, the contact 47*c* to the armature 46*d*, and so on. Contacts 47*y* and 48*y* are connected together, and the contacts 48*b* to 48*y*, inclusive, are severally connected to individual multiconnector relays, hereinafter identified by the reference numeral 54, and also to neon indicator lamps hereinafter identified by the reference numeral 55. A circuit from each of the lamps 55 proceeds to a common bus 56, and the circuits from the multi-connector relays 54 to a common bus 57. The line 51 is connected to a hot AC terminal, and the common bus 57 is connected back to AC common, via cam operated contacts 58B (hereinafter described). Sensitive relays SR are energized when timer contact 58A is closed. If sufficient current is supplied to the signal relays SR to actuate the armature 46*b*, multi-connector relay 54*c* is accordingly energized. Energization of multi-connector relay 54*c* implies that multi-connector relay 54*b* is not energized, since it implies that armature 46*b* is up. Accordingly, energization of any of sensitive relays in the array SR *b* to SR *y* implies that all SR relays bearing identifying letters which precede in the alphabet are energized, and also that all relays whose reference numerals succeed in the alphabet are un-energized, in the latter case because insufficient current is supplied to effect energization. Energization of SR relay *b*, on the other hand, affects energization of only multi-connector relay 54*c*, and so on. Since the contacts 48*y* and 47*y* are interconnected, the chain ends at this point, and multi-connector relay 54 *y* can only be energized if SR *x* relay is energized.

It follows from the preceding description that as the successive weighing operations proceed, and as currents of varying amplitudes are supplied to the bank of sensitive relays, the multi-connector relays will be actuated one by one, each in response to one small range or cell of values of the total current which may be supplied to the SR relays. These current ranges represent weight groupings or cells, and that one multi-connector relay 54 which is actuated represents the weight grouping of the cylindrical object then being weighed by the transducer T.

The several multi-connector relay coils 54 have been described as commonly connected to a common bus 57. The bus 57 proceeds to cam timer contacts 58B, and thence to an AC common line. Accordingly, the energizing circuit to the selected one of multi-connector relays 54 is not completed until such time as the cam timer contacts 58B are closed, which provides adequate time for the transducer to arrive at a condition of balance and for the sensitive relays SR to operate. The timing cycle is illustrated in FIGURE 5 of the accompanying drawings, wherein is displayed a first bar W, which indicates the time, H to I, allotted to the scale to attain a condition of balance. At time I the contacts 58A are closed by timer cam TC, which completes a circuit to sensitive relays SR. The latter remain energized until time O. After the senstitive relays have been actuated, i.e. at time J, contacts 58B close. This completes a circuit for multi-connector relay coils 54. One of the latter now is energized, and closes its contacts, the time allotted being from J to L, and at time L current is supplied to the selected multi-connector relay contacts.

Each of the multi-connector relays 54 includes six pairs of contacts, which are normally open. Corresponding ones of each pair of contacts of the entire assemblage of contacts are connected together to a common lead 72, thence to contact 73 of relay 74.

The sets of contacts of the multi-contact relays 54 are illustrated in FIGURE 4*a* of the accompanying drawings as six rows of contacts, respectively, labeled with the reference letters, *a*, *b*, *c*, *d*, *e* and *f*, the several rows being arranged vertically one under the other. The several contacts in rows, *a*, *b*, *c*, *d*, *e*, are arranged to actuate solenoids 23 of an adding machine 24 containing two banks of actuating plungers, one bank of which is essentially independent of the other, and each bank representing operationally a separate adding machine. Accordingly, while the invention has been illustrated and described as applying to a single adding machine employing two banks of actuating plungers, A1 and A2 two separate adding machines may be employed if desired. The *a* and *b* contacts control bank A1, while the *c*, *d* and *e* contacts controls bank A2. The several contacts have been labeled with numerals to indicate the identity of the plunger of an adding machine which will be actuated when the contacts are closed, in terms of the numerical value of that plunger. So, in the row *a*, and proceeding from right to left, the contacts are numbered one to nine, followed by a blank contact representing zero, followed by a further series of contacts labeled 1 to 9, followed in turn by a blank space representing zero, and again followed by contacts labeled 1 to 4. The *a* row of contacts represents "units" and actuates units plungers of an adding machine. The second row or the *b* contacts, represent tens (wherefore no tens contacts are provided underneath the first 9 contacts of the *a* row). A series of ten tens contacts are provided under the zero and under the nine succeeding units positions of the *a* row, and thereafter five contacts appear under the next succeeding zero space and the next four units contacts, to indicate counts of 20. It follows that any numeral from 1 to 24 may be inserted into the bank A1 according as multi-connector relays 54*b* to 54*y* are selectively actuated.

To provide a few specific examples, if the multi-connector relay 54*b* is energized, units contact 1 will be closed. If the multi-connector relay 54K is energized, none of the units contacts 1–9 will be closed, but a tens contact will be closed in row *b*. When multi-connector relay 54*r* is closed a sevens contact will be closed in row *a* and a tens contact in row *b* so that the multi-connector relay 54*r* represents 17. The multi-connector relay 54*u* does not close any units contact, but closes a "two" contact in *b* or tens row, and therefore represents 20. By analogy, then, it will be seen that as the identity of the actuated multi-connector relays, 54*b* to 54*y*, increases alphabetically from *b* to *y*, in sequence, the first adding machine section will have inserted therein numerals increasing in sequence from 1 to 24. The present embodiment of the invention, accordingly has a limit of 24 different values of weight, which may be arranged by adjustment of the sensitive relay circuits to include any desired range of actual weight values, as desired for a specific operation.

The *c*, *d* and *e* rows of contacts of multi-connector relays 54 represent the squares of the values which are indicated by the *a* and *b* rows, and the squared values are inserted in the second adding machine section. So, the multi-connector relay *b* would be required to energize a "one" contact in row *a*, the multi-connector relay *c* to energize a "four" contact in the row *c*, the multi-connector relay *d* to close a "nine" contact in the units row *c*, the *e* relay to actuate a "six" contact in the units row and a "one" contact in the tens row, to represent 16; the f relay to energize a "five" contact in the units row c and a "two" contact in the tens row d to represent 25, and so on.

The upper contacts of the multi-connector relay 54 (which are illustrated in FIGURE 4a as unconnected) proceed to adding machine actuating solenoids, 23, in accordance with the above-described principles, via a cable AC (FIGURE 6), while the common bus 72 proceeds to normally open contact 73 of slow to operate relay 74, the other contact 75 of which proceeds to DC. Cam operated contacts 58C are read-out contacts, and close shortly after closure of contacts 58B, as indicated in the timing diagram of FIGURE 5 of the accompanying drawings, i.e. at time L. When the contacts 58C close, D.C. energy is supplied to the slow to operate relay 74. Relay 74 closes contacts 73, 75, which completes a circuit from DC to line 72, and energizes the selected adding machine solenoids 23. Accordingly, the cam timer contacts 58C assure that the selected contacts of rows a to f have been closed, before an energizing circuit is completed through the selected contacts to the adding machine actuating solenoids.

On closure of cam operated switch 58E the eject solenoid 122 is energized, and ejects a cylindrical object C from the scale pan 5. At the same time that a circuit is closed for the eject solenoid 122, by the cam operated switch 58E, a circuit is also completed for a slow to operate relay 123 which is connected by a line 124 to one side of the switch 58E. When the relay coil 123 pulls down its armature 125 a circuit is completed directly from DC to counter 61. A current is also completed via line 128 to an "add" solenoid in the adding machine 24, causing the latter to add in the values then recorded on the multi-connector contacts.

A conventional power supply for the system is provided, which supplies plate and heater voltage to the various vacuum tubes employed in the system, and to the various relay circuits, lamps, etc. The power supply is not illustrated, to simplify the exposition.

It will be noted that not all the keys on an adding machine are utilizable, for the weight values 1 to 24, which are employed in the examples of our invention herein described. So any number between 1 and 24 may be added by utilizing the units keys 1–9, and one 10 and one 20 key. The squares of the numbers from 1 to 24, moreover, have units values 1, 4, 5, 6 and 9 only, and a maximum hundreds value of 5. To simplify the mechanism, solenoids 23 are employed only for keys which are required, FIGURE 6 representing the appearance of a typical adding machine employing the minimum number of solenoids for the weight range 1 to 24, and for the squares of these weight ranges. In FIGURE 7 is illustrated a plot of the actual positions and values of the solenoids, in the numbered blocks, as well as the key positions which have no solenoids, by empty blocks.

In the normal operation of the present system, as succeding cylindrical objects are fed to the transducer, they are weighed, the weight is translated to a corresponding current, the current selects a sensitive relay SR, the selected sensitive relay SR selects a multi-connector relay 54, and the selected multi-connector relay 54 actuates two adding machine sections, one of which enters the weight grouping of the cylindrical object and the other of which enters the square of that weight grouping. The operation proceeds automatically, the quantities pertaining to each cylindrical object being inserted into the two adding machines in succession, until such time as a predetermined count is attained on a predetermined counter 61. At that time contacts 80 are closed. When contacts 80 are closed they complete a circuit from the AC common line to an AC hot line via lead 81, and through release solenoid 82. The latter releases armature 83 to its upper position to complete a circuit for indicator lamp 84, which visually indicates completion of an operation, and opens the circuit through line 107 to the motor, stopping the operation of the feeder. Contacts 80 are paralleled by a manual stop switch 85, which similarly may effect energization of release coil 82 and of lamp 84.

The reference numeral 100 denotes a start button, which when closed connects the coil 101 of a start relay between the AC lines. The relay coil 101, when energized, pulls down armature 83 to a contact 104. When the armature 83 is pulled down and makes contact with the lower contact 104, the circuit to the stop indicator 84 is broken and a new circuit is completed through run indicator 106. In parallel with the latter circuit, and connected directly to the contact 104, is a line 107 which proceeds to a motor 110, the circuit for the latter being completed via line 111. Accordingly, when the start switch 100 is closed the motor 110 commences to operate.

The cam operated contacts 58D are Feed-Fail contacts. They are closed just prior to closure of contacts 58C, which close the circuit from the multi-connector contacts to the plunger actuating solenoids of the adding machine 24. In series with the contacts 58D are a pair of contacts 130, which are normally open, and are operated to closed condition when no cigarette is present in scale pan 5. Accordingly, if a cigarette is present in scale pan 5 the cam operated contacts 58D are ineffective to complete a circuit. If no cigarette is present, on the other hand, closure of contacts 58D completes a circuit for relay coil 132, which in turn opens contact pairs 134 and 136. The latter operation breaks the circuits to relay coils 74 and 123, and to eject solenoid 122, and thus renders contacts 58C and 58E ineffective. It follows that the add and eject operations, as well as the insertion of values into adding machine 24, do not take place, and that no count is added into the counter 61. The system is thus in a sense rendered inoperative or disabled, on failure to feed a cigarette to the scale pan 5, for any reason, but becomes operative again on feed of a further cigarette. It will be clear that completion of a normal cycle, in absence of a cigarette, would be equivalent to inclusion of a "one" weight cigarette in a sample, and would invalidate the results obtained from a run taken on that sample.

The feed motor 110 may be controlled independently of start switch 100 and stop switch 85, by means of manual switches 140 and 141. Switch 141 connects feedmotor 110 directly across the A.-C. line, when contact is made with contact 142. This condition is indicated by neon lamp 143, which is connected across the D.-C. line by switch 140, ganged with switch 141.

Each of contacts 58A to 58E is paralleled by a neon lamp indicator, 144B to 144E, to indicate the operative condition of the associated contacts.

To obtain a total, the "total" key 150, of adding machine 24 may be manually actuated.

If it is desired to obtain a count of the number of objects which exceed certain predetermined limits, in respect to weight, in the course of a run, limit counters, as 151, 152 may be connected to selected contacts f of the multi-connector relay contacts. While, as illustrated, counter 152 is connected to contacts representative of a weight represented by numeral 18, and counter 151 is connected to contacts representative of a weight represented by numeral 22, in an exemplary case, in practice either counter may be connected in parallel to any desired range of contacts f, so that counts within these ranges may be obtained, and any member of such counters may be employed.

*Calibration*

Calibration of the present system is required, in order to set the sensitive relays to respond only to weights within desired weight ranges. Briefly described, calibration is accomplished by weighing a series of test cigarettes, each of known weight, and obtaining a reading of setting of a test potentiometer corresponding to each weight. The settings of the test potentiometer are plotted graphically as ordinates, against test weights as abscissae, and a continuous graph drawn through the plotted points. By interpolation it is possible to obtain a potentiometer setting for any desired weight from the graph. Accordingly, potentiometer settings are determined for each weight cell boundary, and the adjusting resistances 44 of the sensitive relays adjusted to bring in each relay at the lower limit of the weight cell appropriate to that relay.

More specifically describing the calibrating operation, and particularly the obtaining of a calibration graph, a test cigarette of known weight is placed in hopper 1, and switch 141 closed at contact 142. Feed motor 110 is thus connected directly across the A.C. line, and commences to run. The motor 110 is permitted to run until the test cigarette falls into scale pan 5. The motor 10 may then be stopped.

Meter switch 202 is now turned counter clockwise until a reading is obtained in meter 203, switch 35a being then in "operate" position. The grids of the several triodes 38, 39, 40, as well as the grid of a further triode 205 are connected, in the operate position of switch 35a, to the slider of potentiometer 31. The latter is supplied with signal representative of weight of the test cigarette under control of photo-cell 19. A source of D.C. analogue voltage (+265 V), at terminal 206, is connected directly with all the anodes of triodes 38, 39, 40 and 205, and also in series with a potentiometer 207. The low voltage end of potentiometer 207 is connected to a slider 208 of a potentiometer 209, connected between terminal 210 and ground. The latter terminal is at −150 V D.C. The setting of slider 211 of potentiometer 207 may therefore be employed, in conjunction with slider 208, to set the potentials of the grids of the triodes while the switch 35a is in "operate" condition, while potentiometer 31 sets the potentials of the grids in the "calibrate" position of switch 35a. The potentiometer 31 is connected at one end to slider 34, of potentiometer 35. The latter is connected between slider 208 and ground.

The meter 203 is in series with the cathode of triode 205, via an adjusting resistance 212. The switch 202, and the resistances 213, 214 selected thereby serve to set the scale of meter 203, since the latter resistances are connected in parallel to a slider 215 of potentiometer 209, and serve as selective shunts around the meter.

Having set in desired values of setting for slider 215, and of resistance for resistances 213, 214, when a test cigarette of known weight is deposited on scale pan 5 a predetermined current flows in potentiometer 31, which develops a predetermined voltage at its slider. This voltage is transferred to the grid of triode 205 and determines cathode current of the latter. Manipulation of selective switch 205 results in a meter reading, a minimum reading occurring for one particular setting of switch 202. This reading is noted.

The switch 35a is then set to "calibrate" position, and slider 211 adjusted to produce the same reading of meter 203. The reading of slider 211 is noted, as the calibration reading for the particular test cigarette.

The procedure hereinabove described is followed for each of the test cigarettes, i.e. a meter reading is obtained for the cigarette, and a potentiometer reading then determined at slider 211, which provides the same meter reading.

For the sake of accuracy each test cigarette is weighed several times, and a potentiometer reading taken each time. The readings for each test cigarette are averaged, and the several average readings plotted against test cigarette weight.

A line is drawn through the plotted points to provide a continuous calibration graph or curve, covering all possible cigarette weights, under normal circumstances. From this graph may be determined the position of slider 211 corresponding with any weight within the scope of the instrument.

In one specific embodiment of the present invention each weight cell is 20 milligrams wide and there are twenty-four cells. It is desired that the center of the twelfth cell represent a target weight for a given brand of cigarette. Accordingly, 10 milligrams are added to and subtracted from the target weight to obtain the boundary weights for the twelfth cell. The boundaries for all other cells are obtained by adding, or subtracting, 20 milligrams from these boundaries. The lower the cell number the heavier the cigarettes included, so that the weights falling within cell #2 is appropriate to the heaviest cigarette expected to be encountered, and cell #24 to the lightest.

Obviously, for other applications than quality control of cigarettes of a given brand other weights and weight cell widths will prove appropriate. These may be provided within the scope of the present invention.

Having obtained values of settings of the slider 211 of potentiometer 207, the switch 35a is placed in calibrate position. Microswitch 220 (FIG. 4c) is closed, and start button 104 depressed. The slider 207 is set for a value appropriate to the lowest weight value, i.e. the lower boundary of cell #2. The variable resistor 44b is then adjusted until sensitive relay SR b is actuated, which in turn supplies power to indicator lamp Lc. The slider 207 is then set for the lower boundary of cell #3, and the variable resistor 44c adjusted until indicator lamp Ld is illuminated. The sensitive relays SR are all adjusted by the same procedure, until the appropriate light comes on.

The sensitive relays and indicator lamps are supplied with current once in each cycle of operation, by timer switches 58A and 58B. Accordingly, the procedure is to adjust each variable resistor 44 slowly, a small amount in each cycle, until the desired indicator lamp is energized. When the lamp is energized with each cycle the resistor 44 is backed off until the lamp fails to come on, and then eased back until it does again.

Each succeeding lower cell boundary is set by its resistor 44, until all twenty-four cell boundaries are set. The procedure is then repeated, since the setting of any resistor 44 affects all the others. The procedure must be repeated until all the resistors are properly set simultaneously, and none requires further adjustment. The system is then ready for operation.

While I have described and illustrated one specific embodiment of the present invention, it will become apparent that variations of the specific details of construction may be resorted to without departing from the true spirit and scope of the invention as defined in the appended claims.

What is claimed is:

1. A system for measuring the total weight of a predetermined number of objects and the sum of the squares of said weights, comprising a weighing device, means for automatically feeding said objects to said weighing device one by one, a first adding machine section, a second adding machine section, means responsive to said weighing device for successively inserting into said first adding machine section the weights of successive ones of said objects, and means responsive to said weighing device for successively inserting into said second adding machine section the squares of the weights of successive ones of said objects.

2. In a computing system, means for feeding objects to a transducer at spaced time intervals, said transducer comprising means for translating the weight of one of said objects to an electrical signal having an amplitude representative of said weight, a plurality of relays connected in parallel to said transducer, each of said relays being arranged to operate in response to a different signal amplitude, whereby a predetermined number of said relays operate and the remainder of said relays do not operate in response to and as a function of any given weight applied to said transducer, a plurality of further relays, means for selectively energizing one only of said further relays in response to and in accordance with selective operation of said first-mentioned relays, said further relays having each a different assigned weight range value, a different set of relay contacts operable by each of said further relays, a first adding machine section having at least units and tens entering solenoids, a second adding machine section having at least units, tens and hundreds entering solenoids, and connections between each set of said contacts and said solenoids for energizing said solenoids selectively to enter the values of said weights in said first adding machine section and the squares of the values of said weights in said second adding machine section.

3. The combination in accordance with claim 2 wherein said system includes means for automatically ejecting each said object from said transducer following translation of the weight of said object to an electrical signal.

4. The combination in accordance with claim 3 wherein is further provided means for sensing the presence of an object at said transducer, and means for in part disabling said system in response to failure of presence of said object at said transducer.

5. A calculating machine comprising a transducer for weighing objects supplied to said transducer, said transducer including means for photo-electrically translating weight to signal amplitude, means for feeding said objects one by one to said transducer, each at a predetermined time in a periodic cycle, means for sensing whether an object has been fed to said transducer at a proper time in said cycle and for modifying said cycle on failure of feed, an array of relay coils connected in parallel to said transducer, each of said relay coils having an armature, a first contact and a second contact, said armatures normally all in contact, one for one, with said first contacts, each of said relay coils arranged to actuate said armatures into contact with said second contacts in response to a predetermined minimum current, means for supplying a different current to each of said relays in response to any given signal amplitude, said currents increasing step-wise in proceeding along said array, a common line connected to all said armatures, a connection from each second contact to a succeeding armature in said array, an array of multi-connector relay coils, a connection from each of said first contacts to one terminal of each of said multi-connector relay coils, and a common connection to the second terminals of said multi-connector relay coils, and a different first and second array of normally open switches operable to closed condition in response to energization of each of said multi-connector relay coils.

6. In a system for performing mathematical calculations, means for feeding objects to a transducer in succession, said transducer including means for converting a measurable quantity pertaining to said objects to an analog electrical signal, means for converting said analog electrical signal to a digital representation of that one of a group of discrete ranges of said measurable quantity within which the measurable quantity falls, each of said ranges having a numerical weight, means for digitally adding the sum of said weights for a predetermined number of said objects, and means for digitally adding the sum of the squares of said weights for said predetermined number of said objects.

7. The combination in accordance with claim 6 wherein is provided means for generating a visual indication of a frequency distribution of said weights for said predetermined number of said objects.

8. The combination in accordance with claim 6 wherein is provided means for automatically terminating operation of said means for feeding objects in response to a predetermined count of said objects.

9. The combination in accordance with claim 6 wherein is provided interlocks for modifying operation of said system on failure of said means for feeding said objects.

10. In a system for performing mathematical calculations pertaining to cigarette production, automatic feed means for feeding cigarettes to a transducer in succession, said transducer including means for converting weight of each of said cigarettes to an electrical analog signal representative of said weight, means for converting said analog electrical signal to a digital representation of one of a group of discrete weights, means for digitally adding said discrete weights for a predetermined number of said cigarettes, and means for digitally adding the sum of the squares of said weights for said predetermined number of cigarettes.

11. The combination in accordance with claim 10 wherein is provided means for generating a visual indication of a frequency distribution pertaining to said weights.

12. A measuring and registering apparatus having in combination, a measuring device, a transducer comprising means responsive to said measuring device for translating the measured value of an object to an electrical signal having an amplitude representative of said value, a plurality of electrical signal responsive elements connected in parallel to said transducer, means for automatically energizing and coordinating in succession a selected number of the said group of elements in response to and as a function of the amplitude of the signal, a plurality of further electrical signal responsive elements, means for selectively energizing and coordinating one only of said further elements in response to and in accordance with the respective operation of said first mentioned elements, and means including electric circuitry controlled by the respective said further elements for registering the measured value.

13. A measuring and computing apparatus having in combination, a measuring device, means for automatically feeding a predetermined number of objects to said device one by one at coordinated time intervals and automatically suspending the feed at the completion of said predetermined number, a transducer comprising means responsive to said measuring device for translating the measured value of an object to an electrical signal having an amplitude representative of said value, a plurality of electrical signal responsive elements connected in parallel to said transducer, means for automatically energizing and coordinating in succession a selected number of the said group of elements in response to and as a function of the amplitude of the signal, a plurality of further electrical signal responsive elements, means for selectively energizing and coordinating one only of said further elements in response to and in accordance with the respective operation of said first mentioned elements, and means including electric circuitry controlled by the respective said further elements for registering the measured value.

14. A system for measuring and registering the weight of objects comprising, a weighing device, means for automatically feeding a predetermined number of objects to said device one by one at coordinated time intervals and automatically suspending the feed at the completion of said predetermined number, a transducer comprising means responsive to said measuring device for translating the measured weight of an object to an electrical signal value having an amplitude representative of said weight, a plurality of electrical signal responsive elements connected in parallel to said transducer, means for automatically energizing and coordinating in succession a selected number of the said group of elements in response to and as a function of the amplitude of the signal, a plurality of further electrical signal responsive elements, means for selectively energizing and coordinating one only of said further elements in response to and in accordance with the respective operation of said first mentioned elements, and means including electric circuitry controlled by the respective said further elements for registering and adding the values corresponding to the respective measured weights of said predetermined number of the objects.

15. A measuring and registering system having in combination a measuring device, means for sequentially feeding a predetermined number of objects to said device one by one, means for successively ejecting the objects from said device, a transducer comprising means responsive to said measuring device for translating the measured value of an object to an electrical signal having an amplitude representative of said value, automatic recording means for utilizing said electrical signal to operate a registering device to record the measured value of said object, electric circuitry arranged to control said feeding means and ejecting means to cause the sequential feed during a cycle of operation of a predetermined number of objects to said device and thereupon terminate the feed, and means for rendering the recording means ineffective in the event the feeding means fails to deliver an object in its normal sequential operation during a cycle.

16. The system in accordance with claim 15 wherein the automatic recording means is operated by electric relays connected to be responsive to said electrical signal.

17. The system in accordance with claim 15 wherein is further provided means for the determination of the number of objects with measured values falling outside predetermined limits.

References Cited in the file of this patent

UNITED STATES PATENTS

| | | |
|---|---|---|
| 2,101,452 | Rauch | Dec. 7, 1937 |
| 2,121,227 | Haegele | June 21, 1938 |
| 2,131,684 | Haegele et al. | Sept. 27, 1938 |
| 2,329,975 | Best | Sept. 21, 1943 |
| 2,376,234 | De Castro | May 15, 1945 |
| 2,469,754 | Tierney | May 10, 1949 |
| 2,489,899 | Kniazuk et al. | Nov. 29, 1949 |
| 2,523,517 | Potter | Sept. 26, 1950 |
| 2,541,039 | Cole | Feb. 13, 1951 |
| 2,688,459 | Merrill et al. | Sept. 7, 1954 |
| 2,715,724 | Oberman et al. | Aug. 16, 1955 |
| 2,733,432 | Breckman | Jan. 31, 1956 |
| 2,745,093 | Holman et al. | May 8, 1956 |
| 2,785,858 | Cheeseman | Mar. 19, 1957 |